(12) United States Patent
Reyes (10) Patent No.: US 12,001,889 B2
(45) Date of Patent: Jun. 4, 2024

(54) FORECASTING AND REPORTING AVAILABLE ACCESS TIMES OF PHYSICAL RESOURCES

(71) Applicant: Alex Reyes, Saratoga, CA (US)

(72) Inventor: Alex Reyes, Saratoga, CA (US)

(73) Assignee: RICOH COMPANY, LTD., Tokyo (JP)

( * ) Notice: Subject to any disclaimer, the term of this patent is extended or adjusted under 35 U.S.C. 154(b) by 135 days.

(21) Appl. No.: 17/191,238

(22) Filed: Mar. 3, 2021

(65) Prior Publication Data

US 2022/0283870 A1    Sep. 8, 2022

(51) Int. Cl.
*G06F 9/50* (2006.01)

(52) U.S. Cl.
CPC .......... *G06F 9/5072* (2013.01); *G06F 9/5011* (2013.01); *G06F 9/5038* (2013.01); *G06F 9/505* (2013.01)

(58) Field of Classification Search
None
See application file for complete search history.

(56) References Cited

U.S. PATENT DOCUMENTS

| 10,025,544 | B1* | 7/2018 | Brahma | H04N 1/00954 |
| 2003/0214657 | A1* | 11/2003 | Stringham | H04L 69/329 |
| | | | | 358/1.15 |
| 2006/0048231 | A1* | 3/2006 | Tanida | G06Q 10/10 |
| | | | | 713/182 |
| 2016/0219189 | A1* | 7/2016 | Kitazaki | H04N 1/00244 |

FOREIGN PATENT DOCUMENTS

GB    2371386 A  *  7/2002  ........... G06F 3/1213

* cited by examiner

*Primary Examiner* — Eric C Wai
(74) *Attorney, Agent, or Firm* — Hickman Becker Bingham Ledesma LLP (57) ABSTRACT

An approach is provided for forecasting and reporting available access times of a physical resource. Availability data of a physical resource may be determined from historical data of the physical resource, counter data of the physical resource, reservation data of the physical resource, constraint data of the physical resource, and criteria data of the physical resource, or any combination thereof. The availability data may be displayed on client computing devices upon request.

20 Claims, 5 Drawing Sheets

402 Receiving a request from a computing device, the request specifying a physical resource 404 Determining, based on one or more metrics associated with the physical resource, availability data for the physical resource 406 Indicating the availability data in a response to the request

Fig. 5

FORECASTING AND REPORTING AVAILABLE ACCESS TIMES OF PHYSICAL RESOURCES

FIELD

The present application relates generally to the field of network computing and, more specifically, to forecasting and reporting available access times of physical resources.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A physical resource, such as a public facility or a shared equipment, may expect visitation or usage. However, different times may be more popular than other times for people to access the physical resource (e.g., visit the public facility, use the shared equipment). A larger gathering of or amount of use by people may cause excessive wait times and may even exceed an access limit for the physical resource. Thus, there is a need for a real-time access solution that suggests available access times of physical resources to improve traffic and/or meet limits.

SUMMARY

The appended claims may serve as a summary. In one aspect, a method is provided. The method comprises receiving a request from a computing device, the request specifying a physical resource; determining, based on one or more metrics associated with the physical resource, availability data for the physical resource; wherein the one or more metrics are determined from historical data, wherein the historical data specifies past access of the physical resource and includes past counter data; wherein the availability data for the physical resource includes one or more times to access the physical resource; indicating the availability data in a response to the request.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments. Various embodiments are described hereinafter in the following sections:

I. OVERVIEW
II. ARCHITECTURE OVERVIEW
  A. NETWORK
  B. TRAFFIC COUNTER DEVICE
  C. CLIENT COMPUTING DEVICE
  D. DATA REPOSITORY
  E. PROCESSING SERVER COMPUTER
III. EXAMPLE GRAPHICAL USER INTERFACES
IV. PROCEDURAL OVERVIEW
V. IMPLEMENTATION EXAMPLES

I. Overview

According to various embodiments, computer-implemented apparatuses, methods, and systems are provided for forecasting and reporting available access times of physical resources. Availability data of a physical resource may be determined from historical data of the physical resource, counter data of the physical resource, reservation data of the physical resource, constraint data of the physical resource, and criteria data of the physical resource, and/or any combination thereof. The availability data may be displayed on client computing devices upon request. This approach provides forecasted available access times that assist users to determine when to access the physical resource, helping to improve traffic and/or meet limits of the physical resource.

An example use case described herein involves a public facility, such as a meeting room, a business office, a medical office, a retail venue, an entertainment venue, a restaurant, or another common area. However, it should be understood that techniques described herein are applicable in other use cases involving other physical resources, such as a shared equipment (e.g., office printers, office multi-functional peripherals, etc.) or another consumable resource.

II. Architecture Overview

Figure 1:
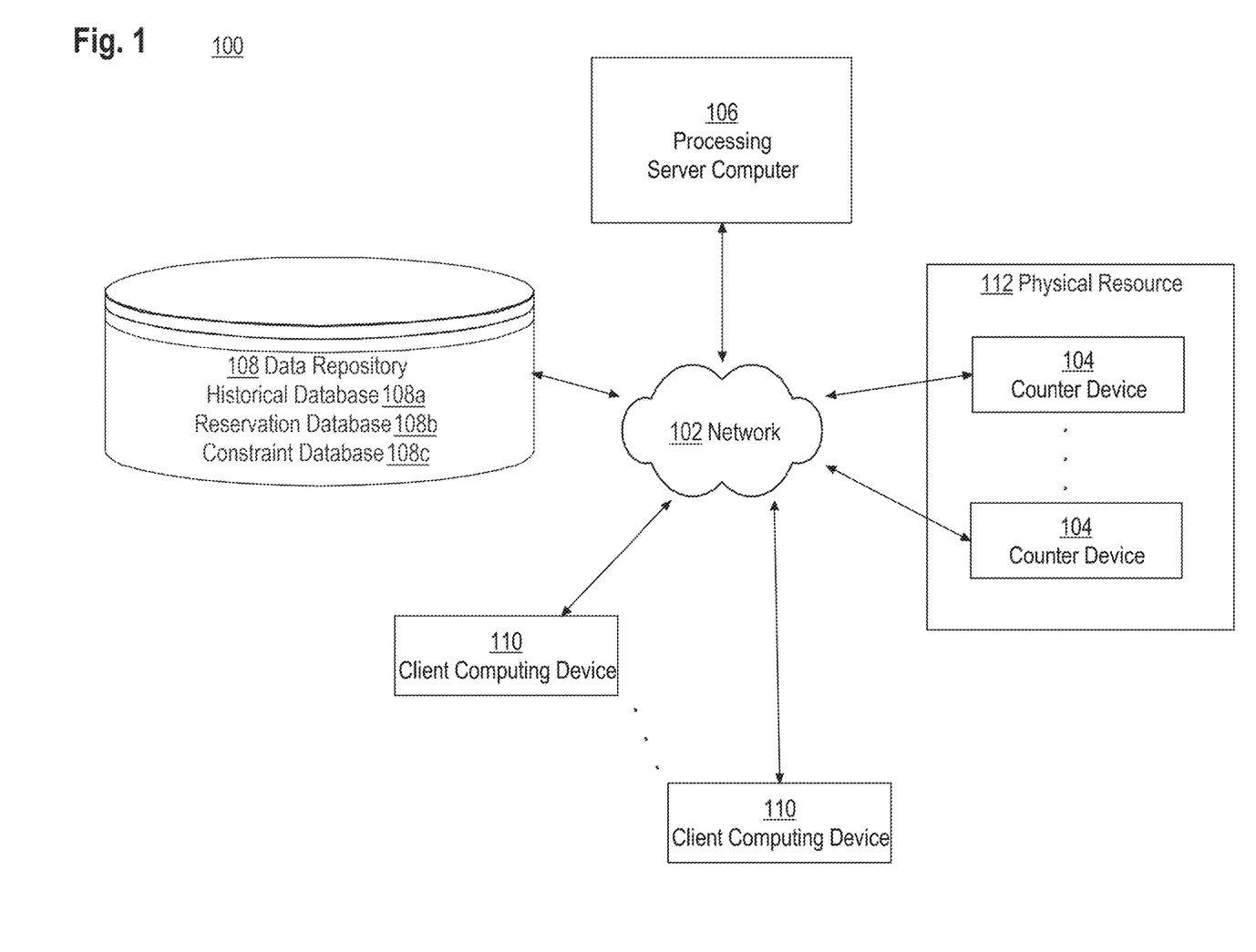
FIG. 1 depicts a networked computer system, according to an embodiment.

FIG. 1 depicts a networked computer system 100, according to an embodiment. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C, or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, the networked computer system 100 includes one or more traffic counter devices 104 (individually and collectively) associated with a physical resource 112, a processing server computer 106, one or more data repositories 108 (individually and collectively), and one or more client computing devices 110 (individually and collectively), all of which are communicatively coupled via a network 102. Although the components of FIG. 1 are depicted and described herein in one particular configuration, this is done for explanation purposes only and the components of FIG. 1 may be configured in any manner.

A. Network

Network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All components described herein may be configured to connect to the network 102 and the disclosure presumes that all components of FIG. 1 are communicatively coupled via network 102. The various components depicted in FIG. 1 may also communicate with each other via direct communications links that are not depicted in FIG. 1 for purposes of explanation.

B. Traffic Counter Device

A traffic counter device 104 measures current access of a physical resource 112, such as a public facility, a shared equipment, or another consumable resource. The discussion herein assumes that the physical resource 112 is a public facility, but embodiments are not limited to this example.

In an embodiment, the traffic counter device 104 measures the number of visitors passing by a certain passage at a public facility, such as a meeting room, a business office, a medical office, a retail venue, an entertainment venue, a restaurant, or another common area. The traffic counter device 104 may use a manual clicker(s), a physical sensor(s), an infrared sensor(s), a thermal imaging system(s), a wireless tracker(s), a scanner(s) or RFID sensor(s), or a video imaging system(s) using machine learning algorithms to measure the number of visitors passing by. The traffic counter device 104 may be configured to distinguish visitors entering the public facility from visitors exiting the public facility and provide a count of each. In an embodiment, the traffic counter device 104 may also measure how long each visitor stays at the public facility.

The public facility may deploy one or more traffic counter devices 104, depending on the coverage of the traffic counter device. For example, the public facility may deploy a traffic counter device 104 located at each entrance of the public facility. For another example, the public facility may deploy a single traffic counter device 104 that is able to cover the entire public facility.

Counter data generated by the traffic counter device(s) 104 deployed at the public facility may be used to determine current access or current occupancy density of the public facility. In an embodiment, the counter data may be, periodically (e.g., every 5 minutes, 10 minutes, hour, etc.) or on-demand, pulled from and/or pushed to a computing device, such as a processing server computer 106, for further processing.

C. Client Computing Device

A client computing device 110 may be implemented by any type of computing device. Example implementations of client computing device 110 include, without limitation, workstations, personal computers, laptop computers, tablet computers, personal digital assistants (PDAs), cellular telephony devices and any type of mobile devices.

In an embodiment, a client computing device 110 is configured with one or more applications that communicate information to and from components in the computer system 100. For example, a user may submit a request from the client computing device 110 to obtain availability data for the public facility from a processing server computer 106. The request may include criteria data specifying a requested access of the public facility. For example, the requested access may identify a size of a party (e.g., one person, six people, etc.) that is planning to access (e.g., visit) the public facility. For another example, the request access may identify a date/time range in which the access of the public facility is to occur (e.g., any time after 2 pm today, between 2 pm and close today, between Monday the $5^{th}$ and Wednesday the $6^{th}$, etc.). The availability data may be used by the user to plan an access of the public facility. For yet another example, the request access may identify a busyness index (e.g., lower than 80%, best time, good time, etc.) of the public facility to access the public facility.

D. Data Repository

A data repository 108 may include one or more databases. As used herein, the term "database" refers to a corpus of data, organized or unorganized, in any format, with or without a particular interface for accessing the corpus of data.

The data repository 108 may include a historical database 108a. The historical database 108a may store historical data specifying past access of the public facility. For example, the historical data includes past counter data (e.g., previously received counter data), past reservation data, and/or other past usage data of the public facility. In an embodiment, the historical data indicates a number of visitors detected by a traffic counter device 104 at specific days and/or times, or during time periods (e.g., 30 seconds, a minute, five minutes) over a specified amount of time, e.g., during the past year. In the context of a shared equipment, the historical data may include additional information, such as the type of use, duration of use, etc.

The data repository 108 may also include a reservation database 108b. The reservation database 108b may store reservation data specifying future access of the public facility. For example, the reservation data may specify one or more future reservations of a physical resource. In an embodiment, the reservation database 108b is updated by a third-party reservation system.

The data repository 108 may also include a constraint database 108c. The constraint database 108c may store constraint data specifying constraints, restrictions, limits, or inaccessibility of accessing the public facility. For example, the constraint data may include a threshold value indicating a maximum occupancy capacity of the public facility. For another example, the constraint data may include downtime data indicating when the public facility, or at least a part of the public facility, is unavailable due to clean up, maintenance, and/or set up. The constraint data may be continuously updated, for example, to address evolving regulations (e.g., due to an outbreak, a disaster, etc.). As an example, the threshold value may be changed from 100 people to 35 people during an outbreak to address social distancing requirements.

The data repository 108 may include one or more other databases storing additional information that may be used by one or more components of the system 100. For example, the data repository 108 may include a customer database storing customer data of customers who access the public facility.

Although the different databases are described as being co-located in a single data repository, the databases may be located in separate data repositories and/or may be managed by different entities, according to some embodiments.

E. Processing Server Computer

A processing server computer 106 may be a system configured to receive, process, and analyze data relating to the public facility, and/or provide information, alerts, or other notifications for the client computing devices 110. In an embodiment, the processing server computer 106 broadly represents one or more computers, such as one or more desktop computers, server computers, a server farm, a cloud computing platform (like Amazon EC2, Google Cloud, container orchestration (Kubernetes, Docker, etc.), or a parallel computer, virtual computing instances in public or private datacenters, and/or instances of a server-based application.

Figure 2:
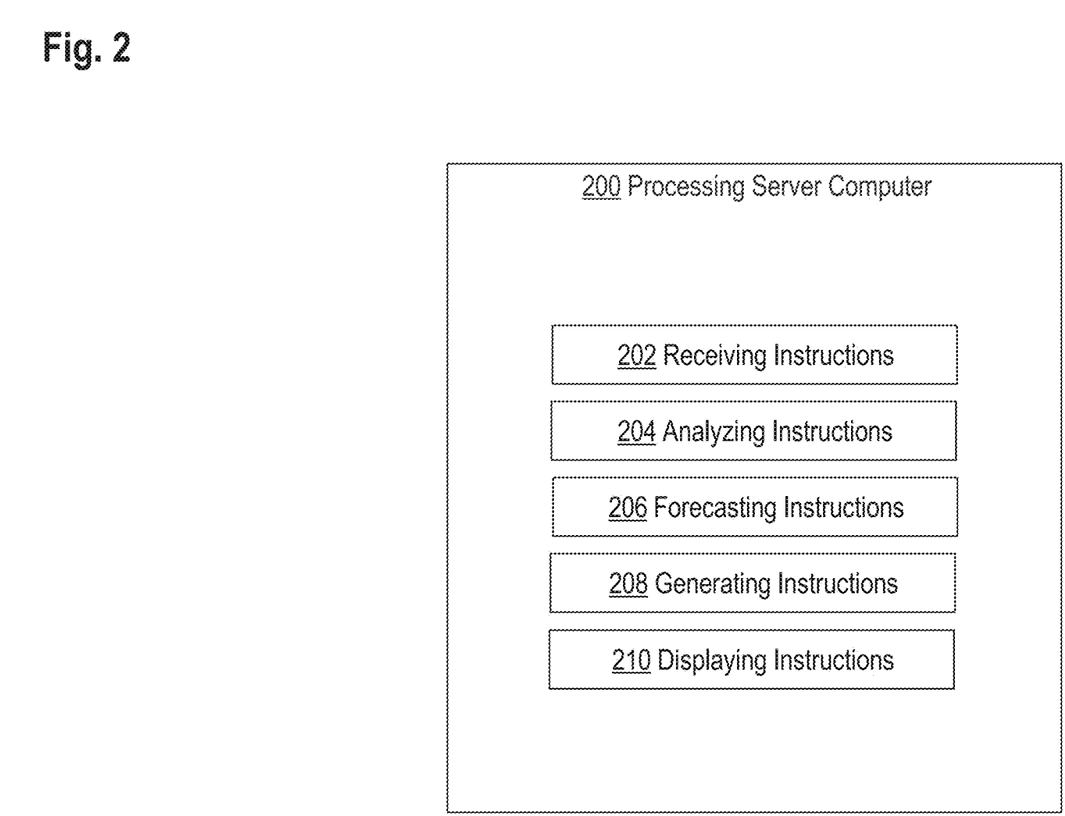
FIG. 2 depicts a processing server computer, according to an embodiment.

FIG. 2 is a block diagram that depicts an implementation of processing server computer 200, according to an embodiment. In an embodiment, the processing server computer 106 of FIG. 1 may be similarly configured as processing server computer 200. The processing server computer 200 may be programmed with receiving instructions 202, analyzing instructions 204, forecasting instructions 206, generating instructions 208, and displaying instructions 210.

The receiving instructions 202 may cause the processing server computer 200 to receive historical data from the historical database 108a of FIG. 1. The processing server computer 200 may access the historical database 108a as new data is available in the historical database 108a. The historical data includes past counter data. At least one source of the past counter data is one or more traffic counter devices 104 of FIG. 1.

In an embodiment, the receiving instructions 202 may also cause the processing server computer 200 to receive current counter data from the one or more traffic counter devices 104, reservation data from the reservation database 108b of FIG. 1, constraint data from the constraint database 108c of FIG. 1, or a combination thereof. The processing server computer 200 may access the one or more traffic counter devices 104 periodically (e.g., every 5 minutes, every 10 minutes, etc.) and/or as often as needed. The processing server computer 200 may access the reservation database 108b and the constraint database 108c as new data is available in the databases 108b, 108c and/or as often as needed. Current counter data, reservation data and/or constraint data may not be available in some scenarios. For example, in a grocery store scenario, reservation data may not be applicable in determining availability data. However, in a restaurant scenario, reservation data would be applicable in determining availability data while counter data may or may not be applicable in determining availability data.

The receiving instructions 202 may also cause the processing server computer 200 to receive a request for availability data from a requesting client computing device 110 of FIG. 1. The request may or may not include criteria data specifying a requested access of the public facility.

The analyzing instructions 204 may cause the processing server computer 200 to analyze the received data.

In an embodiment, the analyzing instructions 204 may be programmed to generate metrics from the historical data. The metrics determined from the historical data indicate general occupancy density at different times based on past accesses of the public facility.

In an embodiment, the analyzing instructions 204 may be programmed to generate metrics from the current counter data. The metrics determined from the current counter data indicate a current occupancy density of the current facility. The metrics determined from the current counter data may also indicate an average visit time.

In an embodiment, the analyzing instructions 204 may be programmed to generate metrics from the reservation data. The metrics determined from the reservation data indicate future occupancy density at different times.

The forecasting instructions 206 may cause the processing server computer 200 to determine availability data of the public facility, using metrics including calculated data relating to the general occupancy density, calculated data relating to the current occupancy density, calculated data relating to future occupancy data, or a combination thereof.

In an embodiment, the forecasting instructions 206 may cause the processing server computer 200 to determine the availability data based on constraint data, criteria data, or both. The criteria data may include requested access identifying a party size (e.g., group of two visitors), a visit date/time range (e.g., any time after 2 pm today), busyness index (e.g., lower than 80%, best time, good time, etc.), and/or other criteria for a requested access of the public facility. The processing server computer 200 may determine availability data that includes one or more times that best satisfy the criteria data but also improve traffic to the public facility, all awhile satisfying the constraint data. For example, if no available times were determined for after 2 pm today, the processing server computer 200 may determine one or more times for after 2 pm tomorrow. The processing server computer 200 may use a default party size (e.g., party of one) and a default visit date/time range (e.g., right now until close) if the criteria data relating to the party size and the visit date/time range are not provided in the request from a requesting client computing device 110.

The generating instructions 208 may cause the processing server computer 200 to generate one or more views or representations of the availability data. For example, a view may include one or more available times to visit the public facility. For another example, a view may include how busy the public facility will be at certain times. In an embodiment, each time may include a time period specifying a start time and an end time. Each time period may be of the same or different time increment.

The displaying instructions 210 may cause the processing server computer 200 to display a view in a graphical user interface on the requesting client computing device 112.

III. Example Graphical User Interfaces

Figure 3A:
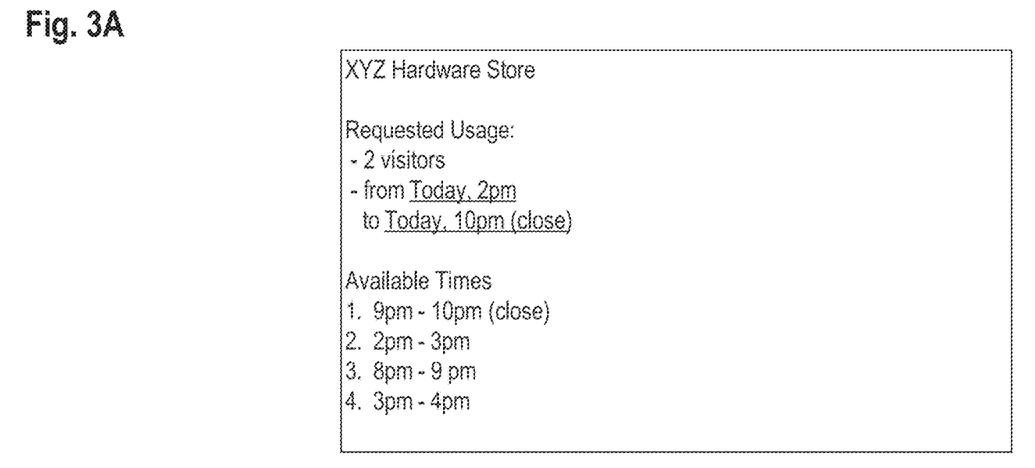
FIGS. 3A, 3B each depicts an example GUI showing availability data, according to an embodiment.
Figure 3B:
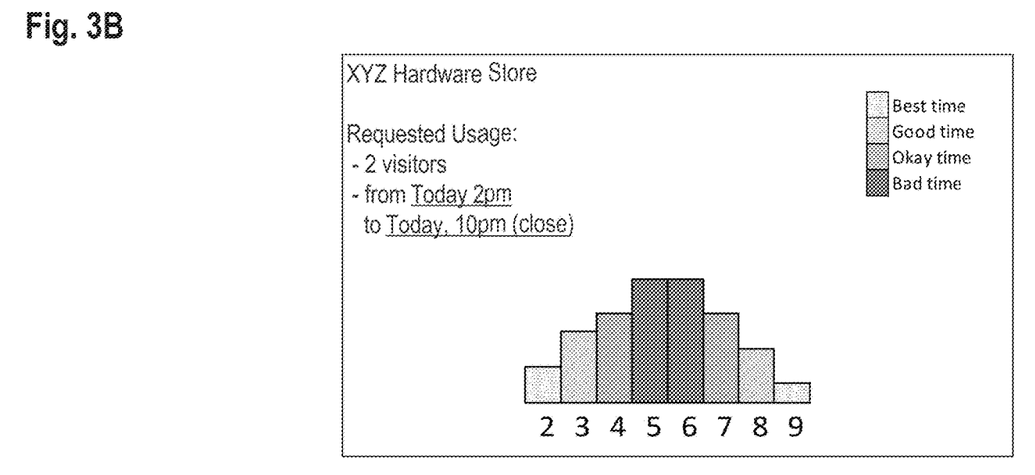

FIGS. 3A, 3B each depicts an example GUI showing availability data, according to an embodiment. In FIGS. 3A, 3B the name of the public facility (e.g., "XYZ Hardware Store") and any criteria data provided in the user request (e.g., two visitors, after 2 pm today) are shown. In FIG. 3A, the available times to visit the public facility are shown. The available times may be ordered according to time, when it is the quietest (e.g., less busy), and/or another arrangement. In FIG. 3B, a graph of how busy the public facility is during the date/time range provided in the user request. Time periods within the date/time range may visually distinguish best times, good times, okay times, and bad times to visit the public facility.

In an embodiment, other metrics, such as average visit time and/or occupancy data, may also be displayed when a particular time is selected.

FIGS. 3A, 3B each represents only one brief example of how availability data is organized and presented, and other implementations and embodiments may be programmed or configured to present availability data in different ways, with different text, characters, of any length, and/or complexity.

IV. Procedural Overview

According to one embodiment, an approach is provided for forecasting and reporting availability times of physical resources. The approach determines available times of a physical resource using historical data, counter data, reservation data, constraint data, and/or criteria data, and provides users of the availability times.

Figure 4:
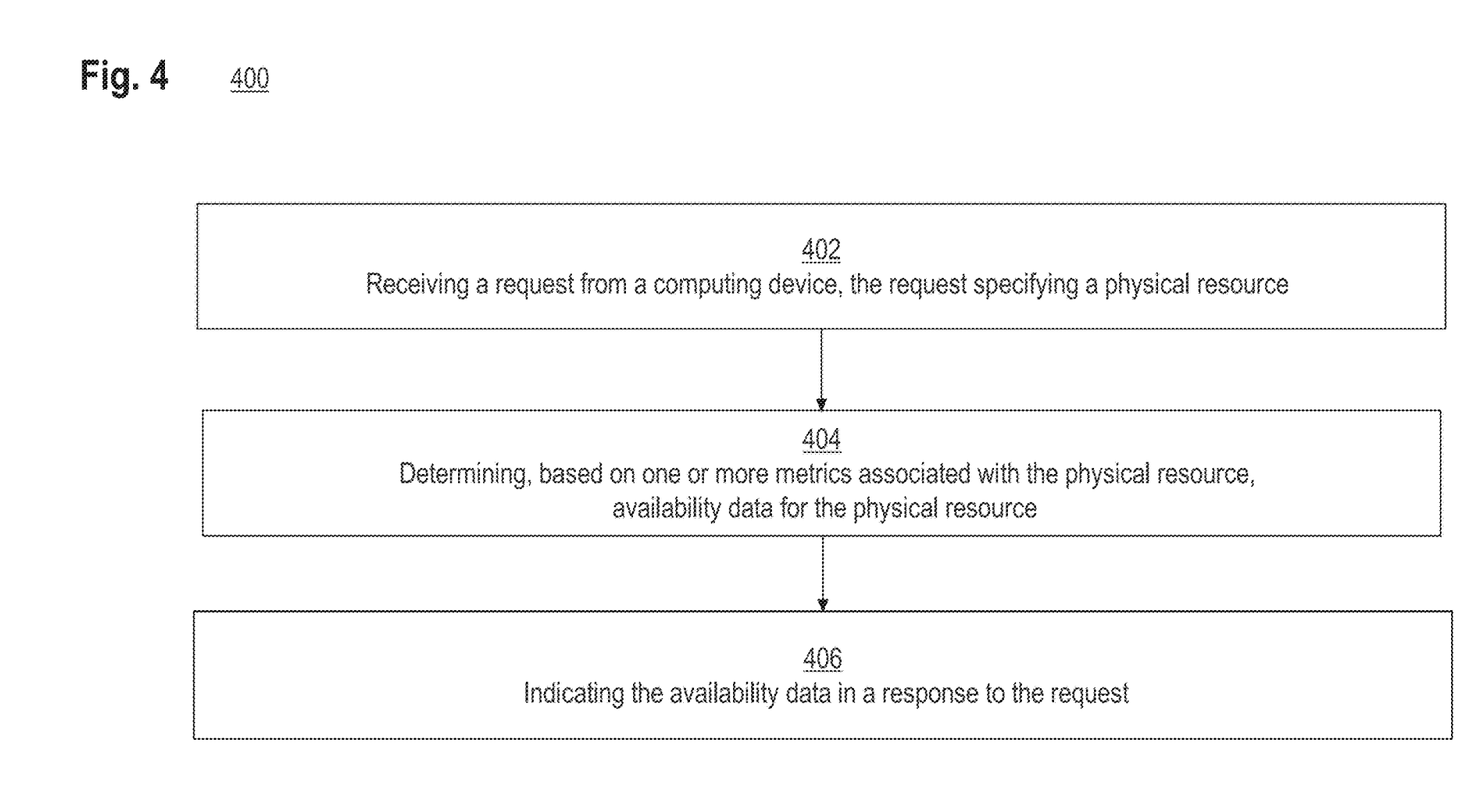
FIG. 4 is a flow diagram that depicts a method of forecasting and reporting available access times of a physical resource, according to an embodiment.

FIG. 4 is a flow diagram that depicts a method 400 of forecasting and reporting available access times of a physical resource, according to an embodiment. The method 400 is performed by one or more processes executing on a data server computer, such as the processing server computer 106 of FIG. 1.

In step 402, the data server computer receives a request specifying a physical resource from a computer device. A physical resource may be a public facility (e.g., restaurant, etc.) or a shared equipment (e.g., office multi-functional peripheral, etc.). For example, the processing server computer 106 receives a request for ABC Restaurant, from a client computing device 110 of FIG. 1.

In an embodiment, the request may include criteria data that specifies at least a requested access for accessing the physical resource. For example, the requested access may identify a size of a party that is planning to visit ABC Restaurant. For another example, the request usage may identify a date/time range in which the visit to ABC Restaurant is to occur.

At step 404, the data server computer determines, based on one or more metrics associated with the physical resource, availability data for the physical resource. The one or more metrics are determined from historical data. The historical data specifies past access of the physical resource and includes past counter data.

In an embodiment, the one or more metrics may also be determined from current counter data that specifies current access of the physical resource. In an embodiment, the current counter data is generated by one or more traffic counter devices located at the physical resource. The data server computer may receive, periodically and/or on-demand, the current counter data from the one or more traffic counter devices located at the physical resource. For example, ABC Restaurant may include one traffic counter device at its only entrance. The traffic counter device generates counter data in which the processing server computer 106 receives regularly and/or on-demand to determine the current number of people at ABC Restaurant.

In an embodiment, the one or more metrics may also be determined from reservation data that specifies future access of the physical resource. For example, ABC Restaurant may take reservations for a week ahead. The reservations anticipate additional occupancy at ABC Restaurant.

In an embodiment, the availability data may also be determined based on the criteria data, on constraint data, or both. The constraint data specifies inaccessibility of accessing the physical resource. For example, the constraint data may include a threshold value (e.g., maximum capacity of 15 people at ABC Restaurant). A default party size and a default visit date/time range if the criteria data relating to the party size and the visit date/time range are not provided in the request.

In an embodiment, the availability data for the physical resource determined at step 404 includes one or more times to access the physical resource. For example, the one or more times include one or more time periods. A time period may specify a start time and an end time. The end time is a time in the future, and the start time is a current time or another time in the future that is earlier than the end time.

At step 406, the data computer server indicates the availability data in a response to the request. In an embodiment, a view of the availability data is displayed in a graphical user interface on the computing device. Example views are illustrated in FIGS. 3A, 3B.

Techniques described herein notify or alert users of available times of physical resources, such a public facility and shared equipment. The availability information assists users to intelligently access (e.g., visit, use) the physical resources and helps improve traffic and/or meet limits of the physical resources. The disclosed techniques herein can improve performance and responsiveness of physical resources, such as an office equipment, and can result in use of fewer computational resources, including less memory and fewer CPU cycles.

V. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
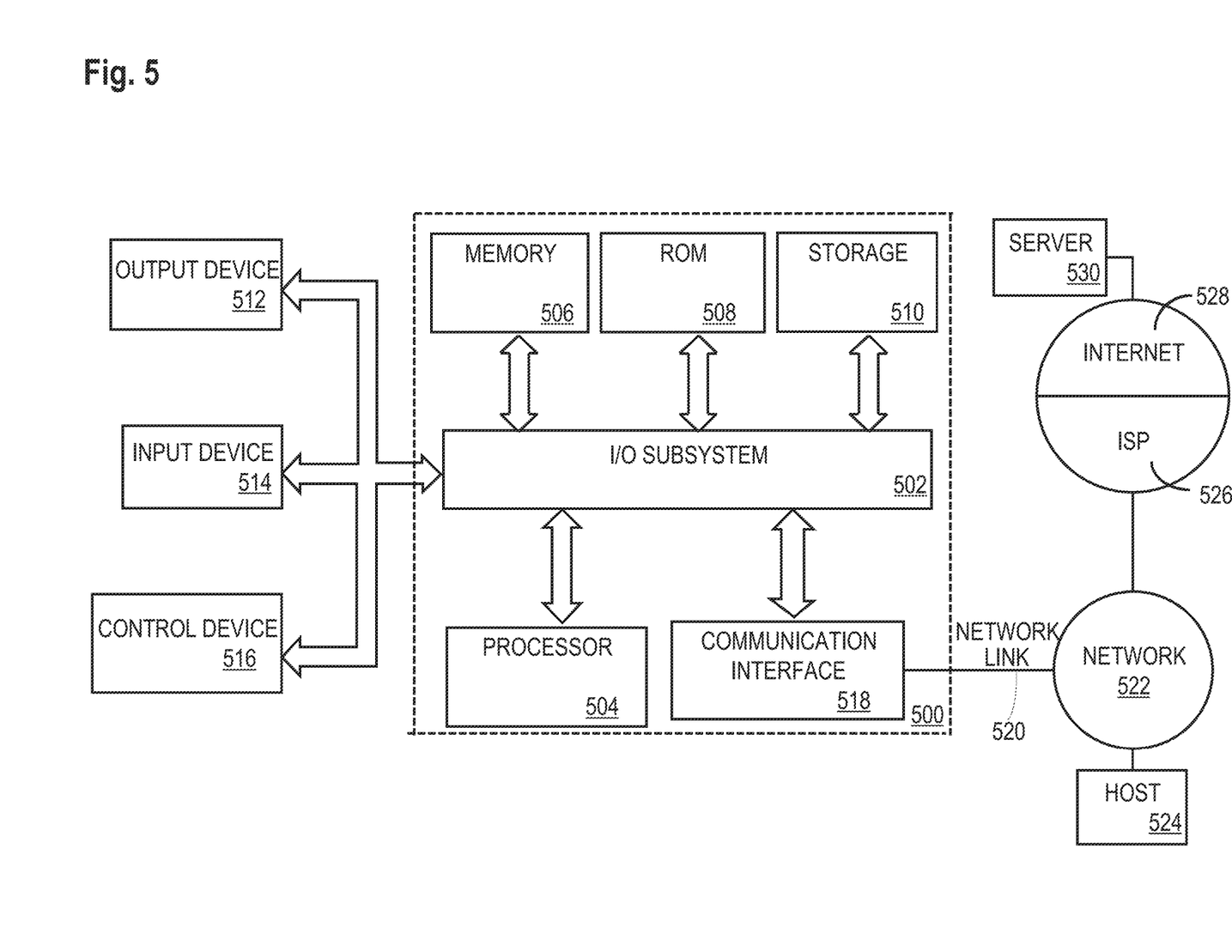
FIG. 5 is a block diagram of a computer system on which embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or Bluetooth technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
    receiving a request from a first computing device, the request specifying a physical premises and a criteria data specifying at least a requested access for the physical premises;
    determining, by one or more processors on a second computing device based on one or more metrics associated with the physical premises, availability data for the physical premises, wherein the availability data for the physical premises includes one or more times to access the physical premises;
    wherein the one or more metrics are determined from historical data that specifies past access of the physical premises that includes past counter data or past reservation data, and current counter data generated by one or more physical traffic counter devices measuring physical traffic of visitors detected in a proximity of the physical premises;
    executing the request by generating a graphical user interface based at least in part on the availability data and the criteria data.

2. The method of claim 1, wherein the one or more metrics are also determined from reservation data that specifies future access of the physical premises.

3. The method of claim 1, wherein the current counter data is received periodically or on-demand from the one or more physical traffic counter devices located proximate to the physical resource.

4. The method of claim 1, wherein the availability data is also determined based on one or more of:
    constraint data that specifies inaccessibility of accessing the physical premises, or the criteria data.

5. The method of claim 1, wherein the one or more times include one or more time periods, wherein each time period of the one or more time periods specifies a start time and an end time, wherein the end time is a time in the future and the start time is a current time or another time in the future that is earlier than the end time.

6. The method of claim 1, wherein the physical premises is a public facility.

7. The method of claim 1, wherein a view of the availability data is displayed in the graphical user interface on the computing device.

8. An apparatus comprising:
    one or more processors; and
    one or more memories communicatively coupled to the one or more processors and storing instructions which, when processed by the one or more processors, cause:
        receiving a request from a first computing device, the request specifying a physical premises and a criteria data specifying at least a requested access for the physical premises;
        determining, by one or more processors on a second computing device based on one or more metrics associated with the physical resource, availability data for the physical premises, wherein the availability data for the physical premises includes one or more times to access the physical premises;
        wherein the one or more metrics are determined from historical data that specifies past access of the physical premises that includes past counter data or past reservation data, and current counter data generated by one or more physical traffic counter devices measuring physical traffic of visitors detected in a proximity of the physical premises;
        executing the request by generating a graphical user interface based at least in part on the availability data and the criteria data.

9. The apparatus of claim 8, wherein the one or more metrics are also determined from reservation data that specifies future access of the physical premises.

10. The apparatus of claim 9, wherein the current counter data is received periodically or on-demand from the one or more physical traffic counter devices located proximate to the physical premises.

11. The apparatus of claim 8, wherein the availability data is also determined based on one or more of:
constraint data that specifies inaccessibility of accessing the physical premises, or the criteria data.

12. The apparatus of claim 8, wherein the one or more times include one or more time periods, wherein each time period of the one or more time periods specifies a start time and an end time, wherein the end time is a time in the future and the start time is a current time or another time in the future that is earlier than the end time.

13. The apparatus of claim 8, wherein the physical premises is a public facility.

14. The apparatus of claim 8, wherein a view of the availability data is displayed in the graphical user interface on the computing device.

15. One or more non-transitory computer-readable media storing instructions which, when processed by one or more processors, cause:
receiving a request from a first computing device, the request specifying a physical premises and a criteria data specifying at least a requested access for the physical premises;
determining, by one or more processors on a second computing device based on one or more metrics associated with the physical premises, availability data for the physical premises, wherein the availability data for the physical premises includes one or more times to access the physical premises;
wherein the one or more metrics are determined from historical data that specifies past access of the physical premises, past counter data, and current counter data generated by one or more physical traffic counter devices located proximate to the physical premises;
executing the request by generating a user interface based at least in part on the availability data and the criteria data.

16. The one or more non-transitory computer-readable media of claim 15, wherein the one or more metrics are also determined from reservation data that specifies future access of the physical premises.

17. The one or more non-transitory computer-readable media of claim 16, wherein the current counter data is received periodically or on-demand from the one or more physical traffic counter devices located proximate to the physical premises.

18. The one or more non-transitory computer-readable media of claim 15, wherein the availability data is also determined based on one or more of:
constraint data that specifies inaccessibility of accessing the physical premises, or the criteria data.

19. The one or more non-transitory computer-readable media of claim 15, wherein the one or more times include one or more time periods, wherein each time period of the one or more time periods specifies a start time and an end time, wherein the end time is a time in the future and the start time is a current time or another time in the future that is earlier than the end time.

20. The one or more non-transitory computer-readable media of claim 15, wherein the physical premises is a public facility.

* * * * *